J. B. TERRY.
Steam-Heating Apparatus.
No. 89,706.
Patented May 4, 1869.
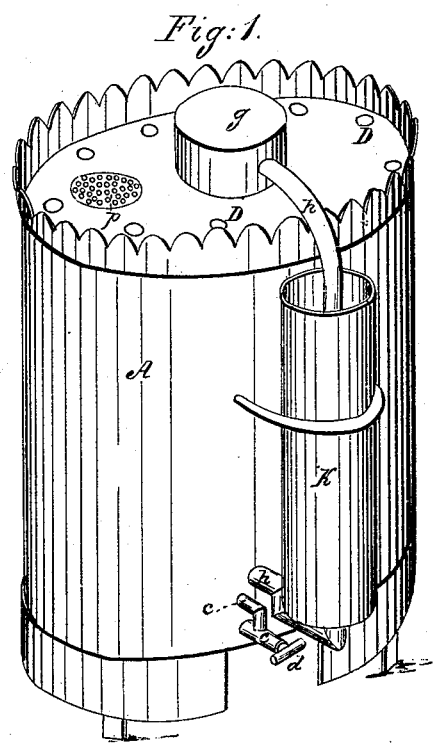
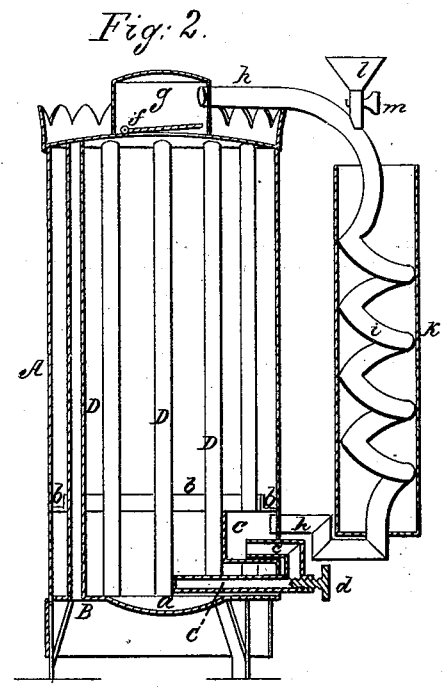
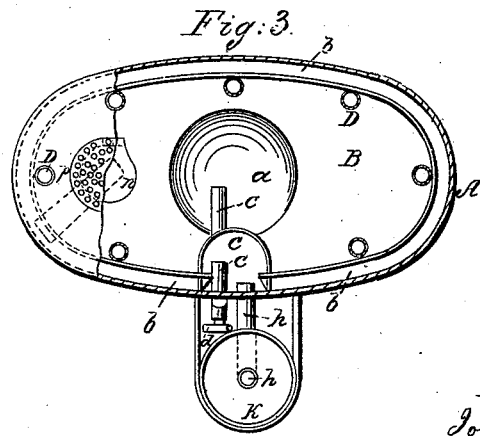
Witnesses.
Inventor
John B. Terry
by his attorney
C. A. Pollok

United States Patent Office.

JOHN B. TERRY, OF BROOKLYN, NEW YORK.

*Letters Patent No. 89,706, dated May 4, 1869.*

IMPROVEMENT IN STEAM-HEATING DEVICE.

The Schedule referred to in these Letters Patent and making part of the same.

*To whom it may concern:*

Be it known that I, JOHN B. TERRY, of Brooklyn, in the county of Kings, and State of New York, have invented certain new and useful Improvements in Heating-Apparatus; and I hereby declare the following to be a full, clear, and exact description of the same, reference being had to the accompanying drawings, in which—

Figure 1 represents a perspective view of an apparatus made in accordance with my invention.

Figure 2 is a vertical central section of the same.

Figure 3 is a horizontal section of the same, partly in plan.

My invention relates to the method of generating heat, by converting a small quantity of liquid into steam within a closed receptacle, and it may be stated to consist, First, in the apparatus for generating the heat, as hereinafter described, by causing the liquid within the receptacle to fall in drops, or in a divided state, upon the bottom, or other part of the receptacle which is heated, whereby the liquid is at once decomposed and converted into highly-heated or superheated steam. If the bottom of the receptacle were covered with water, steam might be generated, but it would not possess the extreme heat which it is the object of my invention to attain. But by permitting only a minute quantity of water or liquid to be brought in contact, at one time, with the highly-heated surface, the steam is, as it were, superheated, and made capable of diffusing a much greater amount of heat.

Second, in the arrangement within the heater of a liquid-reservoir, raised above the heating-surface, and provided with a tube for conducting the water, so that it shall fall in drops, or in a finely-divided state upon the heated surface.

Third, in the combination with the liquid-reservoir and distributing-tube of a trough, arranged around the interior of the heater, to catch the condensed steam, and to conduct it back to the reservoir.

Fourth, in the arrangement with the heater, and with the liquid-reservoir, of a safety-valve for permitting the escape of steam after it attains a certain pressure, and a return and condensing-tube, to condense said escape steam, and carry it back to the liquid-reservoir.

Fifth, in the arrangement, with the aforesaid heating-apparatus, of air-flues, or tubes passing through the heater, and serving to heat, by reason of the heat imparted to them by the steam, the air which passes through them.

Sixth, in the arrangement, with the heater, of an air-valve, so as to be closed against the escape of steam, but to admit air when the heater cools.

To enable others skilled in the art to make and understand my invention, I will now proceed to describe the means by which the same is, or may be carried into effect, by reference to the accompanying drawings.

A represents the body of the heater, which can be made to resemble a stove, or have any other suitable form to adapt it to the uses for which it may be designed.

The gas-jet, or other agency employed to heat the apparatus, is to be placed preferably under, and so as to be brought in contact with the bottom B.

Within the heater is placed the liquid-reservoir C, located a suitable distance above the bottom, or heating-surface B.

From this reservoir the liquid is dropped in a finely-divided state upon the bottom of the heater, which, to adapt it for this purpose, may have a cup-like depression $a$, formed in it.

When the liquid touches the red-hot bottom, it is decomposed into steam, and becomes superheated, which would not be the case were the bottom entirely covered with the liquid.

The high heat of the steam is communicated to the drum A, and to air-heating flues D, which are arranged to pass up through the heater, as shown in the drawing.

As the steam parts with its heat, it condenses, and gathering on the sides of the heater, runs down into the trough $b$, which extends around the inside of the heater, and conducts the liquid back again into the reservoir C.

The liquid may be dropped upon the bottom of the heater by any suitable means.

In the drawing, I have represented for this purpose the elbow-pipe, or tube C, having that part of it which protrudes from the drum, provided with a screw, or device $d$, by means of which the flow of liquid is regulated.

In order to prevent the possibility of an explosion of the heater from too great steam-pressure, I provide a safety-valve $f$, which should be loaded to a suitable degree so as to retain the steam when at ordinary pressure, but to permit its escape when the pressure becomes excessive.

In order to catch any steam which may escape, and conduct it back to the reservoir C, I cover the valve with a dome $g$, from which leads the tube, or pipe $h$, which passes down outside the heater, and opens at its lower end into the liquid-reservoir, as shown clearly in fig. 2.

For the purpose of condensing the escape steam, I form a portion of the return-pipe $h$, into a coil, $i$, which is enclosed within a water-jacket, or tank, $k$, and I also locate upon this pipe the filling-nozzle, or funnel $l$, provided with a suitable cock, or valve, $m$.

To supply the air needed to prevent the formation of a partial vacuum within the apparatus, when the heater is cool, I provide an air-admission valve, $n$, arranged as shown in fig. 3, so as to be closed against the escape of steam, but to admit air from without when occasion requires it.

It is well to cover, or protect this valve with a screen, $p$.

It will be understood that the apparatus, constructed as herein set forth, may be used for warming rooms and other places, for cooking-purposes, and in general for all purposes for which heating-apparatus are usually employed.

What I claim, and desire to secure by Letters Patent, is—

1. An apparatus for generating heat, substantially as herein described, the same consisting of a closed vessel, in which the liquid from the reservoir is converted into steam by falling in drops, or in a highly-divided state upon the heating-surface, and said steam, when condensed, is returned to the reservoir to be used anew, substantially as shown and set forth.

2. The arrangement within the heater of a liquid-reservoir, raised above the heating-surface, and provided with means for conducting the liquid, so that it shall fall in drops, or in a finely-divided state, upon the heating-surface, as set forth.

3. The combination with the liquid-reservoir and distributing-device, of a trough arranged around the interior of the heater, to catch the condensed steam and conduct it back to the reservoir, as shown and set forth.

4. The arrangement with the heater and liquid-reservoir, of a safety-valve, for permitting the escape of steam after it reaches a certain pressure, and a return and condensing-tube, to condense and carry back said steam to the reservoir, as shown and described.

5. The arrangement with the heating-apparatus of air-flues, or tubes, passing through the heater, substantially as shown and specified.

6. The arrangement with the heater of an air-valve, so as to be closed against the escape of steam, but to admit air when the heater cools, as herein shown and set forth.

In testimony whereof, I have signed my name to this specification, before two subscribing witnesses.

J. B. TERRY.

Witnesses:
M. BAILEY,
EDM. F. BROWN.